United States Patent
Bouaziz

(10) Patent No.: US 9,533,577 B2
(45) Date of Patent: Jan. 3, 2017

(54) SYSTEM FOR OPERATING AN INSTRUMENT CLUSTER OF A VEHICLE AND A MOBILE ELECTRONIC DEVICE WHICH CAN BE DETACHABLY HELD BY A HOLDER ON THE VEHICLE

(71) Applicant: AUDI AG, Ingolstadt (DE)

(72) Inventor: Tahar Bouaziz, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/038,309

(22) PCT Filed: Jan. 24, 2015

(86) PCT No.: PCT/EP2015/000133
§ 371 (c)(1),
(2) Date: May 20, 2016

(87) PCT Pub. No.: WO2015/113749
PCT Pub. Date: Aug. 6, 2015

(65) Prior Publication Data
US 2016/0288646 A1    Oct. 6, 2016

(30) Foreign Application Priority Data
Jan. 30, 2014  (DE) .......................... 10 2014 001 182

(51) Int. Cl.
*B60K 35/00*    (2006.01)
*B60K 37/02*    (2006.01)
*B60K 37/06*    (2006.01)

(52) U.S. Cl.
CPC ............... *B60K 35/00* (2013.01); *B60K 37/02* (2013.01); *B60K 37/06* (2013.01)

(58) Field of Classification Search
CPC .......... B60K 35/00; B60K 37/02; B60K 37/06
See application file for complete search history.

(56) References Cited

U.S. PATENT DOCUMENTS

| 6,147,598 A | 11/2000 | Murphy et al. |
| 2006/0155431 A1 | 7/2006 | Berg et al. |

(Continued)

FOREIGN PATENT DOCUMENTS

| DE | 199 35 893 A1 | 2/2001 |
| DE | 101 20 465 A1 | 11/2002 |

(Continued)

OTHER PUBLICATIONS

English Translation of the International Preliminary Report dated Aug. 10, 2016 from International Patent Application No. PCT/EP2015/000133, 8 pages.

(Continued)

*Primary Examiner* — Aaron L Troost
(74) *Attorney, Agent, or Firm* — Staas & Halsey LLP

(57) ABSTRACT

An operator controls a combination instrument of a vehicle where the combination instrument has a display device for displaying a piece of information. Also in the vehicle are a bracket for detachably holding a mobile electronic apparatus, an interface for transmitting signals to the mobile electronic apparatus and for identifying whether there is a mobile electronic apparatus in the bracket, and an operator control device for operator control of the mobile electronic apparatus. Additionally, a processing device is set up to automatically process operator control inputs on the operator control device for operator control of the combination instrument according to whether a mobile electronic apparatus is in the bracket.

16 Claims, 1 Drawing Sheet

(56) References Cited

U.S. PATENT DOCUMENTS

| | | | |
|---|---|---|---|
| 2011/0122074 A1* | 5/2011 | Chen | G01C 21/3688 |
| | | | 345/173 |
| 2011/0263293 A1 | 10/2011 | Blake et al. | |
| 2012/0272145 A1 | 10/2012 | Ryan et al. | |
| 2013/0006526 A1 | 1/2013 | Banus | |
| 2013/0144463 A1 | 6/2013 | Ricci et al. | |
| 2013/0274997 A1 | 10/2013 | Chien | |
| 2014/0043269 A1* | 2/2014 | Kuhn | G06F 3/041 |
| | | | 345/173 |

FOREIGN PATENT DOCUMENTS

| | | | |
|---|---|---|---|
| DE | 103 08 897 A1 | 10/2004 | |
| DE | 10308897 A1 * | 10/2004 | ......... B60R 16/0232 |
| DE | 10 2008 007 388 A1 | 8/2009 | |
| DE | 10 2011 101 808 A1 | 11/2012 | |
| DE | 10 2011 112 383 A1 | 3/2013 | |
| DE | 10 2011 121 108 A1 | 6/2013 | |
| DE | 10 2014 001 182.8 | 1/2014 | |
| EP | 2 103 476 A2 | 9/2009 | |
| JP | 2002-293165 | 10/2002 | |
| WO | 2012/110020 A1 | 8/2012 | |
| WO | PCT/EP2015/000133 | 1/2015 | |

OTHER PUBLICATIONS

German Office Action dated Aug. 7, 2015 from German Patent Application No. 10 2014 001 182.8, 6 pages.
English Language International Search Report dated Apr. 9, 2015 from PCT/EP2015/000133, 2 pages.

\* cited by examiner

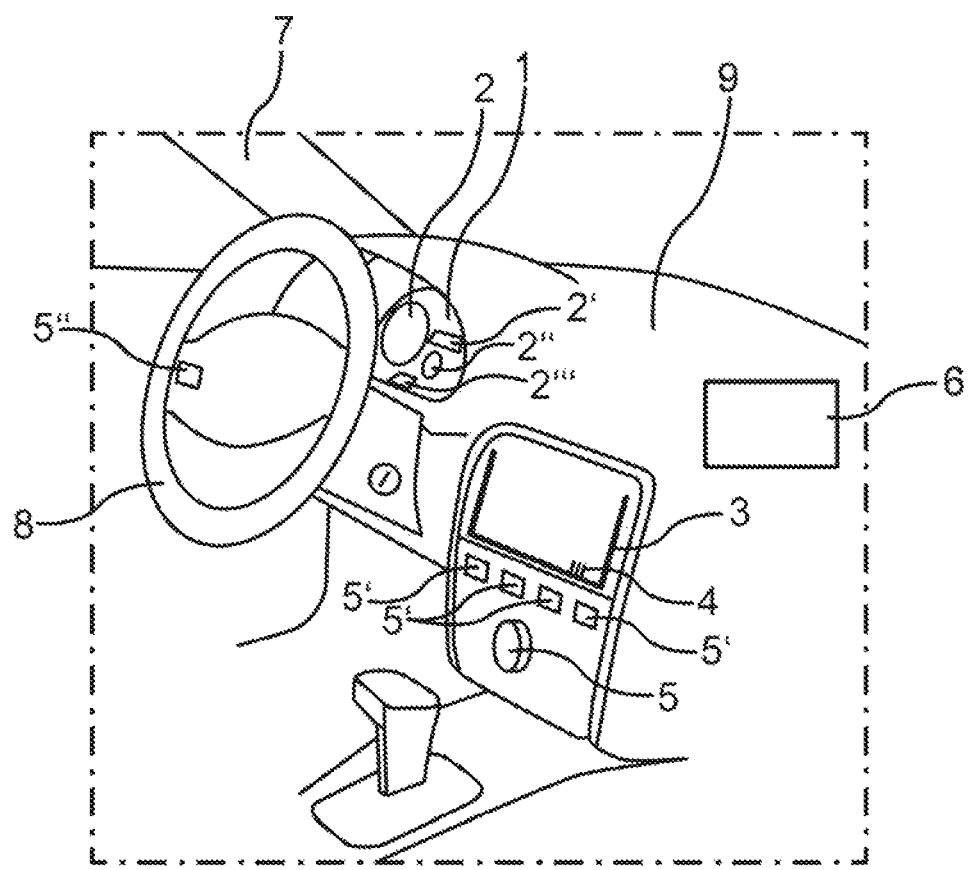

SYSTEM FOR OPERATING AN INSTRUMENT CLUSTER OF A VEHICLE AND A MOBILE ELECTRONIC DEVICE WHICH CAN BE DETACHABLY HELD BY A HOLDER ON THE VEHICLE

CROSS REFERENCE TO RELATED APPLICATIONS

This application is a U.S. national stage of International Application No. PCT/EP2015/000133, filed Jan. 24, 2015 and claims the priority benefit thereof. The International Application claims the priority benefit of German Application No. 10 2014 001 182.8 filed on Jan. 30, 2014. Both the International Application and German Application are incorporated by reference herein in their entirety.

BACKGROUND

Described herein is a system for operator control of a combination instrument of a vehicle and of a mobile electronic apparatus that can be detachably retained by a vehicle-based bracket.

With the increasing number of vehicle functions that are made available by modern vehicles, particularly motor vehicles, the demands on the display devices in the vehicle, which can be used to display information about the various vehicle functions and which can be used to make settings for the various vehicle functions and driver assistance systems, are also rising.

For this reason, many modern motor vehicles have not only the "combination instrument", which is normally arranged behind the steering handle (the steering wheel) as seen from the driver, but also at least one further display device, for example in the form of a display with a high-resolution matrix display, which is often arranged in the region of the central console beside the steering handle.

Since users of vehicles very often also have mobile electronic apparatuses, such as cell phones (smartphones), tablet PCs, mobile navigation devices, etc., solutions have been developed for detachably mounting such mobile electronic apparatuses in a vehicle and coupling them to vehicle-based devices. It is likewise known practice for such mobile electronic apparatuses to be used for displaying vehicle functions in this case, as a result of which the mobile electronic apparatuses may also be suitable for substituting for the aforementioned further display device.

DE 101 20 465 A1 relates to an apparatus for display and/or operator control of vehicle functions in a vehicle, which includes a module having a display and/or operator control unit and having a computer, wherein the computer is designed for communication with other vehicle units. The module forms a standalone unit with a power source that can be operated in an adapter-like bracket provided in the vehicle, and the module can easily be removed from the bracket and, in the removed state, can be operated at least with a prescribed functionality. The module allows substitution for display and/or operator control functions in a vehicle. Furthermore, the module is designed to be able to be operated in parallel beside further modules connected in a vehicle that communicate with one another. The module may also have multimedia capability. A bracket and a bus system are also described.

DE 103 08 897 A1 discloses a motor vehicle having onboard electronics that have an interface for data interchange and also for presentation of information and for control of motor vehicle functions with a PDA (Personal Digital Assistant) or a Smartphone. A docking station is arranged between the interface and the PDA or the Smartphone in the interior of the motor vehicle, and the docking station includes an input and/or output unit coupled to the onboard electronics.

EP 2 103 476 A2 describes a head unit for a motor vehicle, having an operator control element, such as pushbutton switches, switches, rocker switches, rotary controls, etc., for example. EP 2 103 476 A2 further describes first functional components, such as a radio, onboard computer, air conditioning system, sound system, etc., for example. EP 2 103 476 A2 further describes a display device, such as a display, for example, and a data and/or power bus with a docking station for mounting and/or communication and/or power supply for mobile electronic devices that can be integrated into the head unit, particularly for consumer electronics such as PDAs, smartphones or MP3 players, for example. The first functional components are able to be controlled by using the operator control elements, and particularly the display device is able to display information that is connected to the first functional components. The mobile electronic device can be controlled using at least some of the operator control elements arranged in the motor vehicle when the mobile electronic device is communicatively connected to the docking station wirelessly or by wire. The first functional components can have their basic functions controlled either using the operator control elements that are present in the motor vehicle or using the mobile electronic device when the mobile electronic device is communicatively connected to the docking station wirelessly or by wire. The mobile electronic device provides second functional components having special functions, such as navigation, telephone, MP3 player, etc., for example, in the motor vehicle when the mobile electronic device is communicatively connected to the docking station wirelessly or by wire.

DE 10 2011 101 808 A1 describes a method and a system for providing a user interface in a vehicle, in which a wireless data link is set up between the vehicle and a mobile playback device that is detachably connected in the vehicle or that is held freely by a user in the vehicle. The method involves operating parameters that are relevant to the operation of the vehicle being captured in the vehicle, and a display and operator control device that is permanently arranged in the vehicle and can be read from the seat position of the driver being used to display information about captured operating parameters. A wireless data link is set up between the vehicle and a mobile playback device that is detachably connected in the vehicle or that is held freely by a user in the vehicle, the data for producing a display content are transmitted from the vehicle to the playback device via the wireless data link, and the transmitted data are taken as a basis for producing a display content on the playback device that includes information about captured operating parameters that is displayed on the display and operator control device.

Furthermore, DE 10 2011 112 383 A1 discloses a combination instrument for a vehicle, wherein the combination instrument includes a display apparatus for presenting a first piece of information from the vehicle for a user of the vehicle. The combination instrument additionally includes a bracket for holding a mobile apparatus having a display unit, an interface for transmitting a second piece of information that is to be presented from the vehicle to the mobile apparatus and a processing unit. The processing unit is coupled to the interface and designed to capture the second piece of information and to transmit it to the mobile apparatus via the interface.

SUMMARY

Described below is a system for operator control of a combination instrument of a vehicle and of a mobile electronic apparatus, wherein the mobile electronic apparatus can be detachably retained by a vehicle-based bracket and has a display device for displaying a first piece of information. The system may include a combination instrument having a display device for displaying a second piece of information, a bracket for detachably holding the mobile electronic apparatus, an interface for transmitting signals to the mobile electronic apparatus and for identifying whether there is a mobile electronic apparatus in the bracket, and an operator control device for operator control of the mobile electronic apparatus.

The system described herein may additionally include a processing device that is set up to automatically process operator control inputs on the operator control device, for example, for operator control of the combination instrument when there is no mobile electronic apparatus in the bracket and, for example, for operator control of the mobile electronic apparatus when the mobile electronic apparatus is in the bracket.

The system described herein provides intelligent changeover of the operator control device for operator control of the mobile electronic apparatus or the combination instrument. When the mobile electronic apparatus is in the bracket, the operator control device is used for operator control of the mobile electronic apparatus. When the mobile electronic apparatus is not (currently) in the bracket, this is identified by the processing device and operator control inputs on the operator control device are automatically processed as such for operator control of the combination instrument, i.e. in this case the operator control device acts as an operator control device for the combination instrument. When the mobile electronic apparatus is back in the bracket, this is likewise identified by the processing device and operator control inputs on the operator control device are automatically processed as such for operator control of the mobile electronic apparatus, i.e. in this case the operator control device acts as an operator control device for the mobile electronic apparatus again.

According to a first advantageous development of the system, the display device of the combination instrument is set up to be able to display a first piece of information on the basis of an operator control input on the operator control device that is input when there is no mobile electronic apparatus in the bracket.

According to a second advantageous development of the system, the first piece of information may include a piece of engine speed information, a piece of fuel consumption information, a piece of vehicle diagnosis information, a piece of navigation information, a piece of telephone information, a piece of operator control information for an entertainment system of the vehicle, a piece of emergency call information, a piece of time information, a piece of operator control information for an air conditioning system of the vehicle, a piece of distance information, a piece of warning information, a piece of status information and/or a piece of fill level information.

According to a third advantageous development of the system, the combination instrument may include a segmented display device and/or a matrix display device.

According to a further advantageous development of the system, the interface may also be set up to transmit signals from the mobile electronic apparatus to a vehicle-based device, to transmit signals from a vehicle-based device to the mobile electronic apparatus and/or to transmit electric power to the mobile electronic apparatus.

According to yet a further advantageous development of the system, it additionally includes the mobile electronic apparatus, which can be used by a user as a mobile telephone, a mobile navigation device, a mobile electronic personal assistant, a mobile media reproduction device and/or a mobile tablet computer when it is not in the bracket.

Further advantages are obtained when the operator control device in the system has at least one rotary/pushbutton switch, a joystick, a key, a keypad, a switch, a rocker switch and/or a touch and/or proximity sensitive pad.

The system described herein also relates to a vehicle which includes the system.

According to a first advantageous development of the vehicle, the bracket for detachably holding the mobile electronic apparatus may be arranged on the dashboard in a region beside the steering handle.

According to a second advantageous development of the vehicle, the operator control device may be arranged on the steering handle and/or on the dashboard in a region between the driver's seat and the front-seat passenger's seat.

BRIEF DESCRIPTION OF THE DRAWINGS

These and other aspects and advantages will become more apparent and more readily appreciated from the following description of the exemplary embodiments, taken in conjunction with the accompanying drawing of which:

An exemplary embodiment in the single FIGURE shows a schematic view of a partial view of the interior of a vehicle having the system described herein.

DETAILED DESCRIPTION OF THE PREFERRED EMBODIMENT

Reference will now be made in detail to example embodiments in view of the accompanying drawing. The representations in the FIGURE are purely schematic and not to scale. Within the single FIGURE, elements that are the same or similar are provided with the same reference numeral.

The exemplary embodiments explained below are preferred embodiments of the system and vehicle. The system and vehicle are naturally not limited to these embodiments.

As already explained above, the system may be used for alternative operator control of a combination instrument of a vehicle or of a mobile electronic apparatus that can be detachably retained by a vehicle-based bracket and has a display device for displaying a first piece of information.

The system may include a combination instrument 1 having a display device 2, 2', 2", 2''' for displaying a second piece of information, a bracket 3 for detachably holding the mobile electronic apparatus, an interface 4 for transmitting signals to the mobile electronic apparatus and for identifying whether there is a mobile electronic apparatus in the bracket 3, and an operator control device 5, 5', 5" for operator control of the mobile electronic apparatus.

The system may additionally have a processing device 6 that is set up to automatically process operator control inputs on the operator control device 5, 5', 5" as such for operator control of the combination instrument when there is no mobile electronic apparatus in the bracket 3 and as such for operator control of the mobile electronic apparatus when the mobile electronic apparatus is in the bracket 3.

A combination instrument 1 of a vehicle is usually arranged in a region in front of the driver that is easy for the driver to see and can be read clearly even under difficult lighting conditions, for example at night or in bright sunlight. By way of example, the combination instrument may be arranged behind a steering wheel of the vehicle as seen by the driver.

The combination instrument 1 may include at least one display device 2, 2', 2", 2''' for presenting a second piece of information. Provided that there is provision for this by the respective national legislation, this second piece of information may include at least the respective legally prescribed displays or presentations. By way of example, in accordance with the German Road Traffic Licensing Regulation (StVZO §57), the second piece of information may include at least a piece of speed information.

All further pieces of information, which, according to the application, are referred to as "first piece of information" and "first pieces of information", are pieces of information that are not prescribed mandatorily by law but that are meaningful and useful to a user of a vehicle. Unless prohibited by laws or other regulations, first pieces of information can also be presented by using the display device(s) 2, 2', 2", 2''' of the combination instrument 1.

It is therefore known that the combination instrument 1 or the display device(s) 2, 2', 2", 2''' of the combination instrument 1 can often present one or more first pieces of information, such as a piece of distance information ("odometer", "daily odometer"), a piece of engine speed information, a piece of fuel consumption information, a piece of vehicle diagnosis information (onboard computer), a piece of navigation information, a piece of telephone information, a piece of operator control information for an entertainment system of the vehicle (multimedia application), a piece of emergency call information, a piece of time information (for example time of day, journey time, probable time to the end of the journey), a piece of operator control information for an air conditioning system of the vehicle, a piece of warning information (for example owing to an error in the onboard electronics or engine controller, lack of oil pressure, activity by ABS or ESP, distance warning), a piece of status information (for example which headlamps are switched on, status of the direction of travel indicator, coolant temperature, information about servicing to be performed, failure of illuminants) and/or a piece of fill level information (for example for fuel, engine oil), for example.

As display device(s) 2, 2', 2", 2''', the combination instrument 1 can have any suitable device(s), such as mechanical display device(s), segmented display device(s), matrix display device(s) (such as liquid crystal display(s)), lights, pictograms, etc.

Besides a display device(s) 2, 2', 2", 2''', the combination instrument 1 can also have acoustic output capabilities, for example for warning tones or as audible feedback from the turn signal function.

Since space circumstances and hence the display capabilities are by nature limited by the display devices 2, 2', 2", 2''' of the combination instrument 1, first pieces of information are often presented by one or more further display devices outside the combination instrument 1, for example in the region of the central console. This is often a display device having a display. By way of example, this display may be embodied as one having a matrix display device, such as a liquid crystal display device in the form of a TFT display device for presenting any graphical, textual and color information, and if need be in touch or proximity sensitive form. In cases with simpler equipment, this/these display device(s) may also be provided in the form of one or more segmented display device(s). By way of example, a segmented display device can include a liquid crystal display device that includes predetermined actuatable segments in order to present predetermined functions, such as a piece of status information and/or a piece of fill level information, for example.

The mobile electronic apparatus that can be detachably inserted into the bracket 3 in accordance with the system and vehicle as described herein may include a display device for displaying a first piece of information. This display device may be one of the kinds that are usually also used for the further display device(s) described above outside the combination instrument 1.

According to an embodiment, the display device(s) 2, 2', 2", 2''' of the combination instrument 1 is/are set up to be able to display a first piece of information on the basis of an operator control input on the operator control device 5, 5', 5" that is input when there is no mobile electronic apparatus in the bracket 3. In such a case, but also quite generally, it is advantageous if the combination instrument 1 has at least one display device 2, 2', 2", 2''' that can be used to present, at least in terms of content, the same pieces of information (for example map presentation for a navigation system) as the display device of the mobile electronic apparatus. In order to make the difference between the information presented to a driver by the display device 2, 2', 2", 2''' of the combination instrument 1 and by the display device of the mobile electronic apparatus as small as possible for the driver, it is additionally advantageous if at least one display device 2, 2', 2", 2''' of the combination instrument 1 and the display device of the mobile electronic apparatus are as similar to one another as possible, preferably even identical, in terms of size, resolution, presentation capability (color, gray levels, black and white).

With regard to the first piece(s) of information that can be displayed by the combination instrument 1 and the display device of the mobile electronic apparatus when the latter is in the bracket 3, there are no particular limitations. Thus, in an extremely simple case, the display on the combination instrument 1 can be limited to the legally prescribed second piece of information and all first pieces of information can be displayed exclusively on the display device of the mobile electronic apparatus. Alternatively, it is possible for one or more first piece(s) of information to be displayed by the combination instrument 1, particularly when it is information that is conventionally displayed by the combination instrument 1 (for example a piece of rotation speed information, a piece of distance information, a fill level display for fuel, pieces of state information for headlamps and lights, pieces of warning information concerning oil pressure, oil temperature, coolant temperature, engine control, etc.). This/these one or more first piece(s) of information may then either not be displayable by the display device of the mobile electronic apparatus, or provision may be made for these first pieces of information to be displayable in parallel on the display device of the mobile electronic apparatus too, if need be also in a modified or conditioned form.

With regard to the bracket 3, there are no particular restrictions, and it is possible to use any suitable bracket 3 for the system. By way of example, various brackets 3 that can be used for the system are described in the related art cited above. The bracket 3 merely needs to be embodied such that the mobile electronic apparatus can be held therein and securely retained in the bracket 3 during the accelerations that occur during a journey. By way of example, the bracket 3 may be one into which the mobile electronic apparatus can be pushed (for example from the top or from the side), the mobile electronic apparatus being detachably retained in the bracket 3 by mechanical or magnetic means in the pushed-in state.

Provision may be made for the bracket 3 to be detachably mountable in the vehicle 7. As a result, it is possible to provide a suitable bracket 3 for each of different mobile electronic apparatuses. The bracket 3 may also have adjustment capabilities/replacement capabilities that can be used to match the bracket 3 and if need be also the interface 4 to different mobile electronic apparatuses.

The system may include an interface 4 that, in its simplest embodiment, can be used to transmit signals to the mobile electronic apparatus and by which it is possible to identify whether there is a mobile electronic apparatus in the bracket 3. The drawing shows this interface 4 in the form of multiple contacts (such as metal contact pins, metal contacts). These contacts can be brought into contact with corresponding mating contacts on the mobile electronic apparatus when the mobile electronic apparatus is in the bracket 3. In this case, it may be possible to use one or more contacts for transmitting signals and one or more contacts for identifying whether the mobile electronic apparatus is in the bracket 3. For the function of signal transmission and identification of whether the mobile electronic apparatus is in the bracket 3, it may be possible to use the same contact(s).

However, the interface 4 is not limited to the embodiment in the form of one or more mechanical contacts. The interface 4 may also be implemented as a wireless interface for the purpose of transmitting signals, for example using a short range wireless transmission technique, such as near field communication (NFC), Bluetooth, WLAN, infrared light, etc., for example. Furthermore, the identification of whether the mobile electronic apparatus is in the bracket 3 may be implemented using a proximity sensor, magnetic sensor, distance sensor, NFC tag, etc., for example.

With regard to the signals that can be transmitted to the mobile electronic apparatus via the interface 4, there are no particular restrictions and it is possible for all suitable and/or necessary signals to be transmitted in analog and/or digital form to the mobile electronic apparatus via the interface 4.

In its simplest embodiment, it is sufficient if the interface 4 is used to transmit signals to the mobile electronic apparatus that correspond to the operator control actions performed on the operator control device 5, 5', 5" and that are identified by a device of the mobile electronic apparatus, which device is set up for this purpose in a suitable manner, and then the mobile electronic apparatus displays a corresponding piece of information. Since, in this extremely simple embodiment, no signals and/or data are transmitted from devices of the vehicle 7 to the mobile electronic apparatus, the display of pieces of information is normally limited to information that can be made available by the mobile electronic apparatus.

If the mobile electronic apparatus has a corresponding functionality, these pieces of information can include pieces of information for a cell phone, mobile navigation system, mobile electronic personal assistant, a mobile media reproduction device and/or a mobile tablet computer, for example.

In an extended embodiment, the interface 4 can be used to transmit not only the operator control inputs but also signals to the mobile electronic apparatus that are applied to the interface 4, for example the signals of a GPS antenna, data from a databus that is present in the vehicle 7, etc. These data can then be displayed and/or processed by the mobile electronic apparatus.

Preferably, the interface 4 is also set up to transmit signals from the mobile electronic apparatus to a vehicle-based device and/or to transmit electric power to the mobile electronic device.

As a result, it is advantageously possible for the mobile electronic apparatus to request pieces of information or data from one or more vehicle-based devices and for these pieces of information or data to be presented in the display device of the mobile electronic apparatus. Furthermore, an interface 4 set up in such a way can also be used to transmit pieces of information or data from the mobile electronic apparatus to one or more vehicle-based devices. As a result, it is possible to use an appropriately set-up mobile electronic apparatus to make settings for the one or more vehicle-based devices too, for example for an air conditioning device, a seat adjustment device, an entertainment device (such as radio, CD player), a vehicle-based satellite-assisted navigation device, a driving dynamics control system (for example drive assistant).

In this case, the interface 4 can request pieces of information or data from one or more vehicle-based devices directly and/or transmit said information or data thereto, or the interface 4 may be connected to a databus system that is present in the vehicle and that is used to perform the requests/transmissions from/to the one or more vehicle-based devices. The requests/transmissions can be effected by wire or wirelessly. It is also possible for signals to be output to vehicle-based loudspeakers, for example, in this manner.

According to an advantageous development of the system, provision is made for the system to additionally include the mobile electronic apparatus that a user can use as a cell phone, a mobile navigation device, a mobile electronic personal assistant, a mobile media reproduction device and/or a mobile tablet computer when it is not in the bracket 3.

Such mobile electronic apparatuses normally have a dedicated energy store in the form of a rechargeable battery. Therefore, these mobile electronic apparatuses can also be operated without power transmission via the interface 4 in a vehicle. Since the supply of energy in said energy stores is sufficient for operation of such mobile electronic apparatuses only for a period of often just a few hours, however, it is advantageous if the interface 4 can also be used to transmit electric power to the mobile electronic apparatus. This electric power is then used to operate the mobile electronic apparatus and—if necessary—can also be used to charge the energy store of the mobile electronic apparatus.

The transmission of electric power via the interface 4 to the mobile electronic apparatus can be effected by wire or wirelessly (for example by using an induction charging apparatus), for example.

With regard to the operator control device 5, 5', 5" of the system, there are no particular restrictions and it is possible to use any suitable operator control device 5, 5', 5". Preferably, the operator control device 5, 5', 5" has at least one rotary/pushbutton switch 5, a joystick, a key 5', a keypad, a switch 5', a rocker switch 5' and/or a touch and/or proximity sensitive pad 5".

Operator control inputs on the operator control device 5, 5', 5" are identified as operator control inputs for the mobile electronic apparatus or as operator control inputs for the display device(s) 2, 2', 2", 2'" of the combination instrument 1, and processed, by the processing device 6 depending on whether or not there is a mobile electronic apparatus in the bracket 3. By way of example, the processing device 6 may be a hardware or software component of the infotainment system or onboard computer that is already present as standard in modern vehicles 7, or else a standalone assembly or a standalone component.

By way of example, operator control inputs on an operator control device 5, 5', 5" can be processed by the processing device 6 by virtue of, depending on whether or not there is a mobile electronic apparatus in the bracket 3, the respective operator control inputs either being forwarded directly to the combination instrument 1 or to the mobile electronic apparatus or the operator control inputs being converted into instructions, for the presentation of particular pieces of information, to the display device 2, 2', 2", 2'" of the combination instrument 1 or to the mobile electronic apparatus or the display device thereof.

In this case, it is advantageous if the processing device 6 and the combination instrument 1 are set up such that in the event of an operator control input on the operator control device 5, 5', 5" that brings about or triggers a particular display and/or functionality for the mobile electronic apparatus when the mobile electronic apparatus is in the bracket 3, if there is no mobile electronic apparatus in the bracket 3, then an identical or comparable display and/or functionality is brought about or triggered for the combination instrument 1 or the display device(s) 2, 2', 2", 2'" thereof in the event of the same operator control action.

If a particular control input, for example, starts and displays a navigation system on a mobile electronic apparatus that is in the bracket 3, then it is advantageous if, in the absence of a mobile electronic apparatus in the bracket 3, the same operator control input also triggers the start of a navigation system and the start is displayed by the display device(s) 2, 2', 2", 2'" of the combination instrument 1. A corresponding situation applies for settings of the navigation system, for a telephone function, a function of a radio or CD player, etc., for example.

Provision may also be made for the displays by the display device(s) 2, 2', 2", 2'" of the combination instrument 1 to be limited to the display of quite particular information, data, etc., so long as a mobile electronic apparatus is in the bracket 3. By way of example, the displays by the display device(s) 2, 2', 2", 2'" of the combination instrument 1 can, in such a case, be limited to "classic" displays, such as a speed indication, a rotation speed indication, a distance indication, status displays for lights and headlamps that are switched on, and to important warning messages (for example with respect to oil pressure, oil temperature, coolant temperature, coolant level, engine control, etc.). All other pieces of information can be displayed by the mobile electronic apparatus in such a case.

If the mobile electronic apparatus is not (currently) in the bracket 3, then provision may be made for the display device(s) 2, 2', 2", 2'" of the combination instrument 1 to automatically display additional pieces of information that go beyond those cited above. Provision may also be made for a driver to be able to use an appropriate operator control action on the operator control device 5, 5', 5" to select particular pieces of information that he can have displayed by the display device(s) 2, 2', 2", 2'" of the combination instrument 1. It is also possible for particular functionalities that have previously been undertaken by the mobile electronic apparatus to be undertaken by the combination instrument 1, for example the display of a piece of navigation information, a telephone function, a function of a vehicle-based radio or of a CD player, etc. If need be, these functions can then also be controlled, set or altered by using the operator control device 5, 5', 5" using the combination instrument 1 depending on the capabilities of the display devices 2, 2', 2", 2'" of the combination instrument 1.

Provision may additionally be made for the software for controlling the display device(s) 2, 2', 2", 2'" of the combination instrument 1 or the software for controlling the display on the mobile electronic apparatus to be geared to one another or to be able to be geared to one another.

Often, the functions that are available in a vehicle 7, the operator control actions on the operator control device 5, 5', 5" that are required therefor and the display capabilities of the combination instrument 1 are stipulated during production of the vehicle. However, there are also conceivable cases in which, following production of the vehicle 7, there is a change in the available functions, required/possible operator control actions and display capabilities by the combination instrument 1 (for example as a result of subsequent installation of a vehicle-based device, as a result of software-implemented modification/extension of the available function, operator control actions, display capabilities, etc.).

In all such cases, the operator control of the mobile electronic apparatus can be matched to this vehicle, for example by virtue of the installation of a program (application, what is known as an app) tailored to the specific vehicle.

A vehicle 7, particularly a motor vehicle, may include the system described herein.

As shown schematically in the drawing, it is advantageously possible for the bracket 3 for detachably holding the mobile electronic apparatus to be arranged on the dashboard 9 in a region beside the steering handle 8. In vehicles that are intended for countries with traffic on the right, this region is situated on the right beside the steering handle 8, and in vehicles that are intended for countries with traffic on the left, it is accordingly situated on the left beside the steering handle 8. Positioning of the bracket 3 beside the steering handle 8 is not imperative, however, and any other suitable positioning of the bracket 3 in the vehicle 7 may be provided (for example in the roof area). It is merely important that the bracket 3 is arranged in the vehicle 7 such that a driver can see the display device of the mobile electronic apparatus from his driver's seat.

As is likewise shown schematically in the drawing, it is advantageously possible for the operator control device 5, 5', 5", which in all cases is one that is embodied physically separately from the mobile electronic apparatus, to be arranged on the steering handle 8 and/or on the dashboard 9 in a region between the driver's seat and the front-seat passenger's seat. This positioning of the operator control device 5, 5', 5" is also not imperative, and any other suitable positioning of the operator control device 5, 5', 5" in the vehicle may be provided.

If the mobile electronic apparatus itself has an operator control device or an operator control capability (for example in the form of virtual or real pushbutton switches, a touch and/or proximity sensitive display or pad), then the latter may, when the mobile electronic apparatus is in the bracket 3, either be deactivated (so that operator control of the mobile electronic apparatus is possible only using the operator control device 5, 5', 5") or else continue to be activated. In the latter case, a user can use an operator control that is familiar to him for the mobile electronic apparatus even when the mobile electronic apparatus is in the bracket 3. On the other hand, from the point of view of operator control of the mobile electronic apparatus in the vehicle that distracts from the road traffic as little as possible, it may be advantageous if the operator control device or the operator control capability of the mobile electronic apparatus is or becomes limited to the operator control device 5, 5', 5" of the system while the mobile electronic apparatus is in the bracket 3.

The system described herein provides intelligent changeover or focusing of an operator control device 5, 5', 5" between a combination instrument 1 and a mobile electronic apparatus having a display device. The mobile electronic apparatus can be detachably inserted into a bracket 3 that is arranged at a suitable location in a vehicle 7, and it is then possible for the operator control device 5, 5', 5" to be used to present content, data and information on the display device of the mobile electronic apparatus and if need be also to make settings for vehicle-based devices.

When the mobile electronic apparatus is unplugged, that is to say is removed from the bracket 3, the operator control device 5, 5', 5" automatically changes over and controls the combination instrument 1.

When the mobile electronic apparatus is inserted back into the bracket 3, the operator control device 5, 5', 5" automatically changes over and controls the mobile electronic apparatus.

When it is not in the bracket 3, the mobile electronic apparatus can be used by a user (for example driver, passenger, passenger) as a cell phone, a mobile navigation device, a mobile electronic personal assistant, a mobile media reproduction device and/or a mobile tablet computer, in more general terms as a mobile electronic apparatus.

Since the devices, apparatuses, components, parts, etc. and the possible interaction thereof are known to persons skilled in the art, they do not need to be discussed in more detail in the application.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A system for alternative operator control of at least one instrument of a vehicle and a mobile electronic apparatus that has a first display device for displaying a first piece of information, the system comprising:
    a combination instrument having a second display device configured to display a second piece of information;
    a bracket configured to detachably hold the mobile electronic apparatus;
    an interface configured to transmit signals to the mobile electronic apparatus and identify whether the mobile electronic apparatus is in the bracket;
    an operator control device, physically separated from the mobile electronic apparatus, configured to receive an input for alternative operator control of the mobile electronic apparatus and of the combination instrument; and
    a processing device configured to automatically process operator control inputs to the operator control device for operator control of the combination instrument when no mobile electronic apparatus is in the bracket and for operator control of the mobile electronic apparatus when the mobile electronic apparatus is in the bracket, and
    when no mobile electronic apparatus is in the bracket and an operator control is input to the operator control device to cause a particular functionality by the mobile electronic apparatus when the mobile electronic apparatus is in the bracket, the processing device is configured to cause the particular functionality to be performed by the combination instrument.

2. The system as claimed in claim 1, wherein the second display device of the combination instrument is configured to display a first piece of information based on the operator control input on the operator control device that is input when there is no mobile electronic apparatus in the bracket.

3. The system as claimed in claim 2, wherein the first piece of information includes at least one of a piece of distance information, a piece of engine speed information, a piece of fuel consumption information, a piece of vehicle diagnosis information, a piece of navigation information, a piece of telephone information, a piece of operator control information for an entertainment system of the vehicle, a piece of emergency call information, a piece of time information, a piece of operator control information for an air conditioning system of the vehicle, a piece of warning information, a piece of status information, and a piece of fill level information.

4. The system as claimed in claim 3, wherein the second piece of information includes speed information of the vehicle.

5. The system as claimed in claim 1, wherein the second display device of the combination instrument includes at least one of a segmented display device and a matrix display device.

6. The system as claimed in claim 1, wherein
    the vehicle includes a vehicle-based device, and
    the interface is configured to transmit at least one of signals from the mobile electronic apparatus to the vehicle-based device and electric power to the mobile electronic apparatus.

7. The system as claimed in claim 1, further comprising the mobile electronic apparatus, the mobile electronic apparatus being configured to operate as at least one of a mobile telephone, a mobile navigation device, a mobile electronic personal assistant, a mobile media playback device, and a mobile tablet computer, when the mobile electronic apparatus is not in the bracket.

8. The system as claimed in claim 1, wherein the operator control device includes at least one of a rotary switch, a pushbutton switch, a joystick, a key, a keypad, a switch, a rocker switch, a touch sensitive pad, and a proximity sensitive pad.

9. The system as claimed in claim 1, wherein the interface includes at least one of a metal contact, proximity sensor, magnetic sensor, distance sensor, and a near field communication tag, configured to identify whether the mobile electronic apparatus is in the bracket.

10. The system as claimed in claim 1, wherein the interface includes a wireless interface that uses at least one of near field communication, Bluetooth communication, a wireless local area network, and infrared light, configured to identify whether the mobile electronic apparatus is in the bracket.

11. The system as claimed in claim 1, wherein when the mobile electronic apparatus is returned to the bracket, the processing device is configured to receive an indication from the interface that the mobile electronic apparatus is in the bracket, and subsequent operator control inputs to the operator control device are automatically processed by the processing device for operator control of the mobile electronic apparatus.

12. The system as claimed in claim 1, wherein the first piece of information is displayable by the second display device of the combination instrument in parallel with the first display device of the mobile electronic apparatus.

13. The system as claimed in claim 1, wherein when the processing device determines no mobile electronic apparatus is in the bracket and an input to the operator control device is to start and display a navigation system on the mobile electronic apparatus, the processing device automatically processes the input by causing the navigation system to start and be displayed on the second display device of the combination instrument.

14. A vehicle comprising a system capable of communicating with a mobile electronic apparatus having a first display device for displaying a first piece of information, the vehicle comprising:
   a body;
   a combination instrument having a second display device configured to display a second piece of information;
   a bracket configured to detachably hold the mobile electronic apparatus;
   an interface configured to transmit signals to the mobile electronic apparatus and identify whether the mobile electronic apparatus is in the bracket;
   an operator control device, physically separated from the mobile electronic apparatus, configured to receive an input for alternative operator control of the mobile electronic apparatus and of the combination instrument; and
   a processing device configured to automatically process operator control inputs to the operator control device for operator control of the combination instrument when no mobile electronic apparatus is in the bracket and for operator control of the mobile electronic apparatus when the mobile electronic apparatus is in the bracket, and when no mobile electronic apparatus is in the bracket and an operator control is input to the operator control device to cause a particular functionality by the mobile electronic apparatus when the mobile electronic apparatus is in the bracket, the processing device is configured to cause the particular functionality to be performed by the combination instrument.

15. The vehicle as claimed in claim 14, further comprising:
   a dashboard; and
   a steering handle, wherein the bracket is arranged on the dashboard in a region beside the steering handle.

16. The vehicle as claimed in claim 14, further comprising:
   a dashboard;
   a steering handle; and
   front seats,
   wherein the operator control device is arranged on at least one of the steering handle and the dashboard in a region between the front seats.

* * * * *